(12) United States Patent
Lee et al.

(10) Patent No.: US 12,429,926 B2
(45) Date of Patent: Sep. 30, 2025

(54) HINGE FOR AUXILIARY DISPLAY

(71) Applicant: MOBILE PIXELS INC., Irwindale, CA (US)

(72) Inventors: Chuhung Lee, Medford, MA (US); Xiaoliang Yao, Burlington, MA (US); Wenglong Ng, Burlington, MA (US)

(73) Assignee: MOBILE PIXELS INC., Irwindale, CA (US)

( * ) Notice: Subject to any disclaimer, the term of this patent is extended or adjusted under 35 U.S.C. 154(b) by 208 days.

(21) Appl. No.: 18/371,681

(22) Filed: Sep. 22, 2023

(65) Prior Publication Data
US 2025/0103108 A1    Mar. 27, 2025

(51) Int. Cl.
*G06F 1/16*    (2006.01)

(52) U.S. Cl.
CPC .................. *G06F 1/1681* (2013.01)

(58) Field of Classification Search
CPC .... G06F 1/1681; G06F 1/1647; G06F 1/1649; E05D 7/0009; E05D 5/0223–0238
See application file for complete search history.

(56) References Cited

U.S. PATENT DOCUMENTS

| | | | | |
|---|---|---|---|---|
| 6,341,061 B1* | 1/2002 | Eisbach | ................ | G06F 1/166 345/905 |
| 9,624,704 B1* | 4/2017 | Hsu | .......................... | E05D 3/12 |
| 10,296,048 B1* | 5/2019 | Wang | .................... | G06F 1/1654 |
| 10,599,189 B1* | 3/2020 | Hsu | ........................ | G06F 1/1681 |
| 10,802,551 B1* | 10/2020 | Lin | ........................ | E05D 3/122 |
| 2004/0196209 A1* | 10/2004 | Chen | .................... | G06F 1/1601 345/1.1 |
| 2019/0145457 A1* | 5/2019 | Hsu | ........................ | F16C 11/04 16/368 |
| 2020/0033911 A1* | 1/2020 | Moser | .................... | G06F 1/162 |
| 2020/0371563 A1* | 11/2020 | Collins | .................... | H05K 7/16 |
| 2020/0392983 A1* | 12/2020 | Chang | .................... | F16C 11/04 |
| 2021/0333839 A1 | 10/2021 | Yao et al. | | |
| 2021/0382527 A1* | 12/2021 | Cheng | ................ | H04M 1/0216 |
| 2023/0034612 A1* | 2/2023 | Hillyerd | ................ | G06F 1/1681 |
| 2023/0213982 A1* | 7/2023 | Huang | .................... | F16C 11/04 361/679.27 |

* cited by examiner

*Primary Examiner* — Anthony Q Edwards
(74) *Attorney, Agent, or Firm* — Lando & Anastasi, LLP

(57) ABSTRACT

According to an aspect of the disclosure, an auxiliary display system comprises a hinge coupling a mount to a display portion. The hinge includes a first flange portion configured to couple to the mount, a second flange portion configured to couple to the display portion, inner pivot pins coupled to the flange portions, outer pivot pins coupled to the flange portions, a first connector having a first end rotatably coupled about the inner pivot pin of the first flange portion and a second end rotatably coupled about the outer pivot pin of the second flange portion, and a second connector having a first end rotatably coupled about the inner pivot pin of the second flange portion and a second end rotatably coupled about the outer pivot pin of the first flange portion.

22 Claims, 21 Drawing Sheets

HINGE FOR AUXILIARY DISPLAY

FIELD OF TECHNOLOGY

The disclosure relates to electronic device display systems in general, and more particularly, to auxiliary electronic device display systems and hinges for same.

SUMMARY

In accordance with one aspect, there is provided an auxiliary display system. The system comprises a mount configured to be coupled to a computing device, a display portion including a display screen, and at least one hinge coupling the mount to the display portion and enabling rotation of the display portion relative to the mount about an axis of rotation. The at least one hinge includes a first flange portion configured to be mechanically coupled to the mount, a second flange portion configured to be mechanically coupled to the display portion, inner pivot pins coupled to each of the respective first and second flange portions at positions proximate the other of the respective first and second flange portions, outer pivot pins coupled to each of the respective first and second flange portions at positions distal from the other of the respective first and second flange portions, a first connector having a first end rotatably coupled about the inner pivot pin of the first flange portion and a second end rotatably coupled about the outer pivot pin of the second flange portion, and a second connector having a first end rotatably coupled about the inner pivot pin of the second flange portion and a second end rotatably coupled about the outer pivot pin of the first flange portion.

In some embodiments, each of the first flange portion and the second flange portion include pairs of side members through which the respective inner pivot pins and the respective outer pivot pins pass.

In some embodiments, the first flange portion includes at least one flange extending from a side of one of the side members of the first flange portion in a direction parallel to the axis of rotation, and the second flange portion includes at least one flange extending from a side of one of the side members of the second flange portion in a direction parallel to the axis of rotation.

In some embodiments, the at least one flange of the first flange portion extends from the side of the one of the side members of the first flange portion at a location proximate an end of the first flange portion distal from the second flange portion, and the at least one flange of the second flange portion extends from the side of the one of the side members of the second flange portion at a location proximate an end of the second flange portion distal from the first flange portion.

In some embodiments, the inner pivot pins and outer pivot pins of both of the first flange portion and the second flange portion pass through the pairs of side members of the respective first flange portion and second flange portion in directions parallel to the axis of rotation.

In some embodiments, the inner pivot pins of both of the first flange portion and the second flange portion are fixedly coupled to the respective pairs of side members of the respective first flange portion and second flange portion.

In some embodiments, the outer pivot pins of both of the first flange portion and the second flange portion pass through slots defined in the respective pairs of side members of the respective first flange portion and second flange portion.

In some embodiments, the outer pivot pins of both of the first flange portion and the second flange portion reciprocate through the slots defined in the respective pairs of side members of the respective first flange portion and second flange portion upon rotation of the first flange portion relative to the second flange portion.

In some embodiments, the slots have lengths providing for the first flange portion of the hinge to rotate from zero to 180° relative to the second flange portion of the hinge.

In some embodiments, the outer pivot pins of both of the first flange portion and the second flange portion are disposed at inner ends of the slots defined in the respective pairs of the side members of the respective first flange portion and second flange portion when the hinge is in a fully extended configuration.

In some embodiments, the outer pivot pins of both of the first flange portion and the second flange portion are disposed at outer ends of the slots defined in the respective pairs of the side members of the respective first flange portion and second flange portion when the hinge is in a fully folded configuration.

In some embodiments, the hinge is configured to rotate between a fully open position in which the pair of side members of the first flange portion are colinear with the pair of side members of the second flange portion to a fully folded configuration in which the pair of side members of the first flange portion are parallel to but not colinear with the pair of side members of the second flange portion.

In some embodiments, the pairs of side members of each of the respective first flange portion and the second flange portion are arranged in parallel and define spaces therebetween in which at least portions of each of the first connector and second connector are disposed.

In some embodiments, each of the side members of the first flange portion is colinear with a respective one of the side members of the second flange portion when the hinge is in a fully extended configuration.

In some embodiments, the first flange portion of the hinge is configured to rotate from zero to 180° relative to the second flange portion of the hinge.

In some embodiments, the first connector and the second connector each include a plurality of elongated plates arranged in parallel.

In some embodiments, the plurality of plates of the first connector are interdigitated with the plurality of plates of the second connector.

In some embodiments, each of the plurality of plates of the first connector and the plurality of plates of the second connector have same shapes and dimensions.

In some embodiments, the system further comprises a central pin passing through each of the plurality of plates of the first connector and the plurality of plates of the second connector.

In some embodiments, the central pin passes through each of the plurality of plates of the first connector and the plurality of plates of the second connector in a direction parallel to the axis of rotation.

In some embodiments, the central pin passes through each of the plurality of plates of the first connector and the plurality of plates of the second connector in a direction co-linear with the axis of rotation.

In some embodiments, each of the inner pivot pins and the outer pivot pins lie in a common plane including the axis of rotation when the hinge is in a fully extended configuration.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1A:
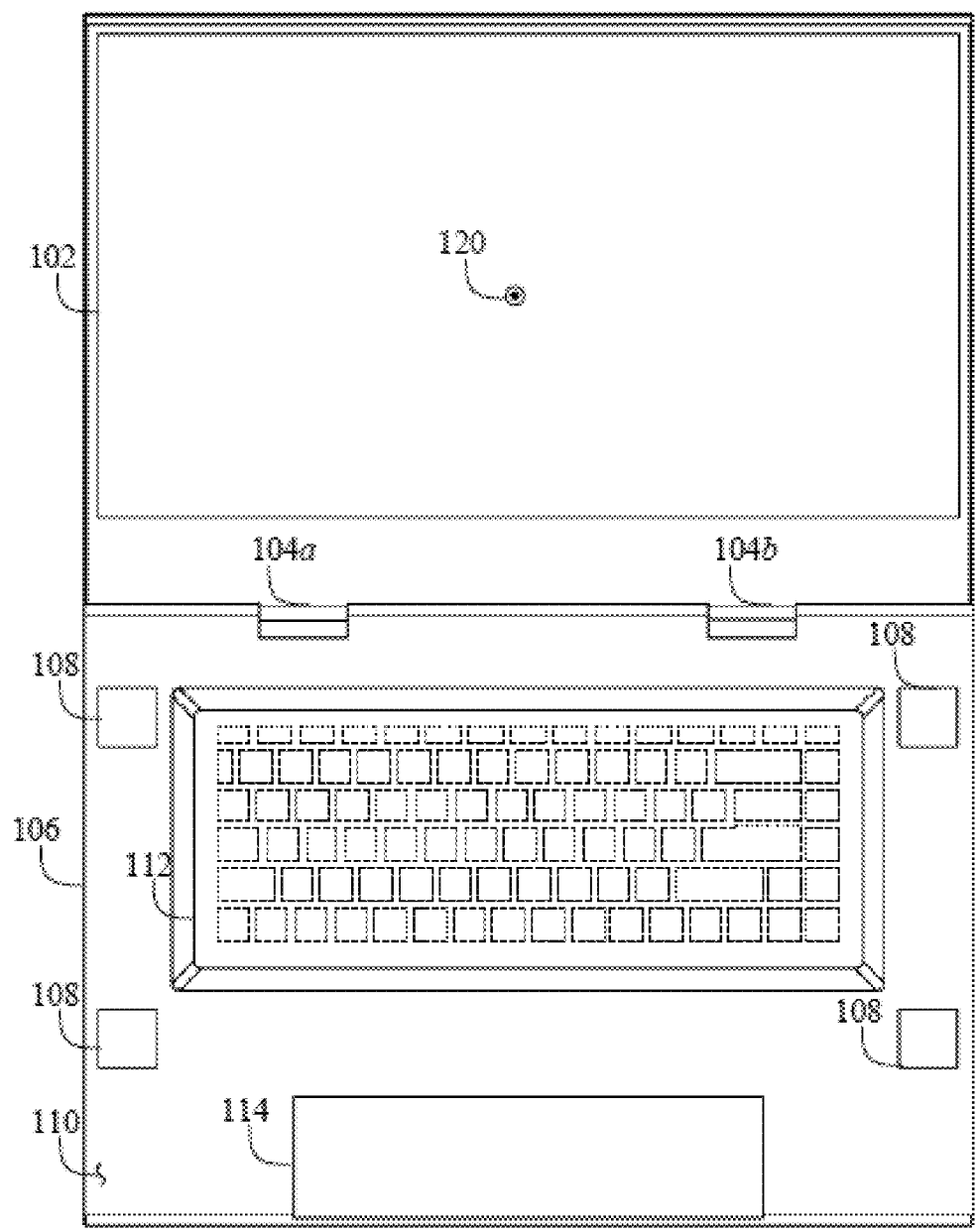
FIG. 1A illustrates a front view of an auxiliary display system in an open position according to one example.

Conventional laptop computers generally include a display screen to provide output information to a user. The size of the display screen is determined at least partially for the purpose of optimizing user enjoyment. For example, users may value laptop computers for their compactness and portability, which may require a reduction in display screen size. However, users also value display screens that are sufficiently large for the user to comfortably view displayed information. Accordingly, there is an inherent tension in selecting a display screen size for laptop computers having a single screen.

Design tensions associated with the implementation of a single screen may be circumvented with the addition of a second, auxiliary display system communicatively coupled to the laptop computer. For example, a second, auxiliary display system may be removably physically coupled to a backplane of a primary laptop screen. In use, a user may rotate or otherwise reposition an auxiliary screen from a closed state and orient the auxiliary screen in a desired orientation. For example, the auxiliary screen may be rotated to face the user from a position above the laptop computer screen from the perspective of the user. A user may alternately maintain the auxiliary screen in a closed state such that information may be provided to another entity.

Adding a second, auxiliary display system coupled to the backplane of the primary laptop screen avoids many of the design tradeoffs associated with increasing the size of a single screen. Modern laptop computer display screens are typically significantly larger in screen area than in screen thickness. Accordingly, whereas increasing the area of a single display screen yields a proportional increase in the amount of information conveyed by the display screen, adding a second, auxiliary display system affixed to the backplane of the primary display screen provides approximately twice as much information at the cost of a relatively small increase in thickness. The addition of a second, auxiliary display system therefore yields a significant increase in information density (that, the amount of information conveyed relative to the physical footprint of the laptop computer) compared to increasing the size of a single primary laptop screen.

The auxiliary display system may be oriented in various orientations, including a closed orientation, an open orientation, a standing orientation, a laptop orientation, or a cantilevered orientation. In a closed orientation, an auxiliary screen may face away from the user, approximately anti-parallel from the primary laptop screen. For example, the closed orientation may be beneficial where the user does not desire to view the auxiliary screen, or desires to display information to a viewer across from the user.

In one example of an open orientation, the auxiliary screen may be rotated to face the user, approximately parallel with the primary laptop screen. For example, one example of the open orientation may be beneficial where the user wishes to view both the primary laptop screen and the second, auxiliary screen simultaneously. In a standing orientation, the auxiliary display system may be physically separated from the laptop computer and may stand independently from the laptop computer as a bipod formed by two portions of the second, auxiliary display system. For example, the standing orientation may be beneficial where the user wishes to view both the primary laptop screen and the second, auxiliary display system next to one another as physically separated devices.

In a laptop orientation, the auxiliary display system may be physically separated from the laptop computer and may stand independently from the laptop computer in a manner similar to the laptop computer. The auxiliary display system may include a mount portion lying co-planar with a surface on which the auxiliary display system is placed, and a display portion rotatable about the mount portion to display information to a user. The mount portion may include a keyboard and/or pointing input device to receive user inputs. The laptop orientation may be beneficial where the user wishes to use the auxiliary display system as a laptop computer. For example, the laptop orientation may be particularly beneficial where the auxiliary display system is coupled to a device, such as a mobile communication device, configured to execute an operating system for the auxiliary display system.

In a cantilevered orientation, the auxiliary display system may be physically separated from the laptop computer and may stand independently from the laptop computer in a manner similar to the laptop orientation. For example, the auxiliary display system may include a mount portion lying co-planar with a surface on which the auxiliary display system is placed, and a display portion rotatable about the mount portion to display information to a user. However, whereas the back surface of the mount portion may face the surface on which the auxiliary display system is placed in the laptop orientation, in the cantilevered orientation the front surface of the mount portion may face the surface on which the auxiliary display system is placed. For example, the cantilevered orientation may be particularly beneficial where the user does not desire to use certain user input functionality, such as a keyboard and pointing device, but wishes to view information displayed by the auxiliary display system.

In various examples, an auxiliary screen system may be implemented in connection with an electronic device other than a laptop computer. For example, the auxiliary screen system may be implemented in connection with a mobile electronic device, such as a smartphone, a gaming console, or another type of electronic device. In addition to displaying information provided by the electronic device, the auxiliary screen system may provide additional functionality when coupled to the electronic device. For example, the auxiliary screen system may include a keyboard and/or touch-sensitive pad or screen and execute functionality similar to that of a laptop computer.

Figure 1B:
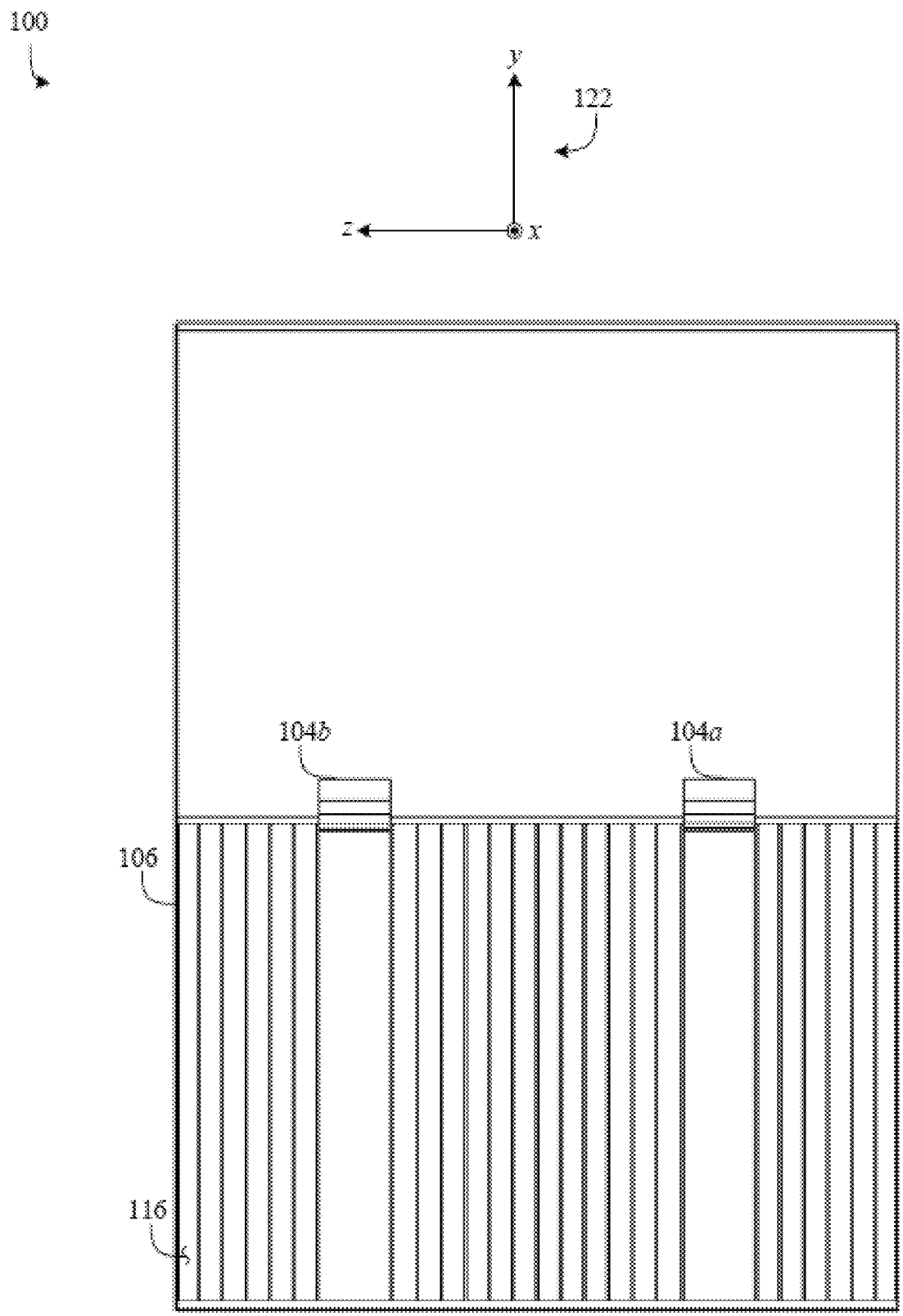
FIG. 1B illustrates a back view of the auxiliary display system in the open position according to one example.
Figure 1C:
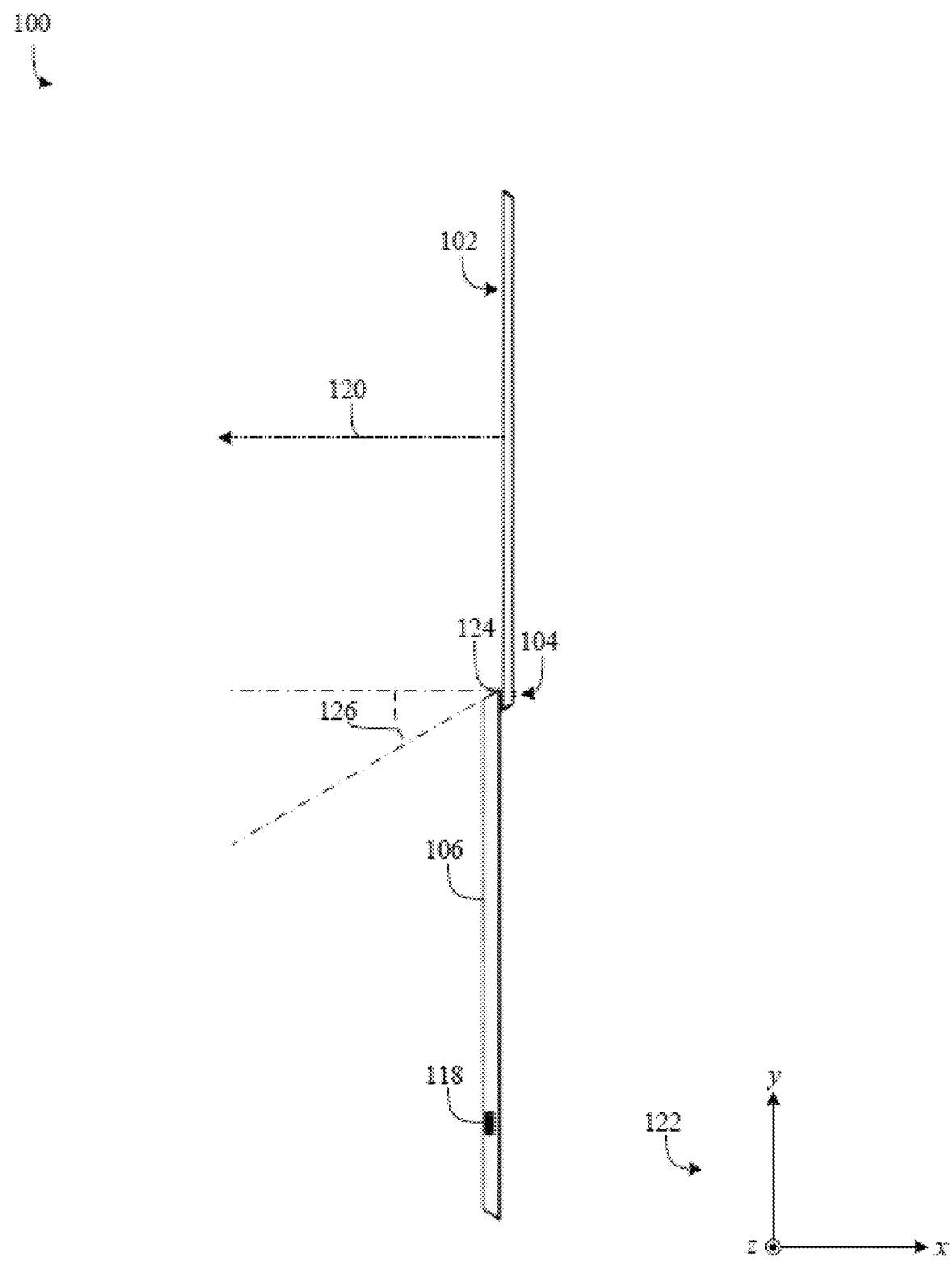
FIG. 1C illustrates a side view of the auxiliary display system in the open position according to one example.

FIG. 1A illustrates a front view of an auxiliary display system 100 in an open position according to one example. FIG. 1B illustrates a back view of the auxiliary display system 100 in the open position according to one example. FIG. 1C illustrates a side view of the auxiliary display system 100 in the open position according to one example.

The auxiliary display system 100 includes a display portion 102, a first hinge 104a and a second hinge 104b (collectively, "hinges 104"), a mount 106, coupling elements 108, a front surface 110, a first input portion 112, a second input portion 114, a back surface 116, and a wired connection port 118. The auxiliary display system 100 may be configured to be coupled to another electronic device. In some examples, the auxiliary display system 100 may be physically coupled to another electronic device via the coupling elements 108, and may be communicatively and/or electrically coupled to the electronic device via the wired connection port 118. In other examples, the auxiliary display system 100 may be communicatively and/or electrically coupled to another electronic device via the wired connection port 118, but may not be physically coupled to the electronic device except for the connection via the wired connection port 118. In still other examples, the auxiliary display system 100 may be communicatively and/or electrically coupled to another electronic device via a wireless communicate interface in addition to, or in lieu of, a wired connection, such as by being wirelessly coupled according to a Wi-Fi wireless communication protocol, a Bluetooth wireless communication protocol, and so forth. As used herein, a "communications interface" may include a wired communication interface, such as the wired connection port 118, a wireless communications interface, a combination of both, and so forth.

The display portion 102 is configured to display information for viewing by a user along an auxiliary display axis 120, which is normal to a surface of the display portion 102 and antiparallel to an x-axis of a legend 122. For example, the display portion 102 may include a display screen, such as a liquid-crystal display screen, configured to display information to a user. The displayed information may be provided to the auxiliary display system 100 by another electronic device communicatively coupled to the auxiliary display system 100 via the wired connection port 118. In some examples, the display portion 102 is also configured to receive input information including, for example, touch inputs from a user's finger, inputs from a stylus operated by a user, and so forth. For example, the display portion 102 may include a touch-sensitive display screen configured to receive user inputs from the user. In some examples, the display portion 102 may include a tablet computer.

The hinges 104 are configured to enable the display portion 102 to rotate relative to the mount 106. More particularly, the hinges 104 may enable the display portion 102 to rotate about the z-axis indicated by the legend 122, also referred to herein as a "hinge axis," a "rotation axis," or an "axis of rotation." Rotation of the display portion 102 enables a user to orient the display portion 102 in a desired orientation, such as by rotating the display portion 102 to face the user or to face another person.

For example, the hinges 104 may enable the display portion 102 to rotate 180° clockwise (that is, −180° with reference to a right-handed coordinate system) about the z-axis from the position shown in FIG. 1C to a closed position. The closed position may be particularly advantageous where the user wishes to display information on the display portion to a person facing the user.

The hinges 104 may further enable the display portion 102 to rotate at least 90° counterclockwise (or 90° with reference to a right-handed coordinate system) about the z-axis from the position shown in FIG. 1C such that the auxiliary display axis 120 is antiparallel to the y-axis. In some examples, the display portion 102 may rotate counterclockwise beyond the x-axis. For example, a top edge 124 of the mount 106 may be beveled at a bevel angle 126 relative to the x-axis. The hinges 104 may enable the display portion 102 to rotate counterclockwise about the z-axis past the x-axis by a number of degrees equal to the bevel angle 126.

One example of a hinge 104 that may be used in aspects and embodiments of the auxiliary display system disclosed herein is illustrated in a fully open (also referred to as "fully extended" or "flat") configuration in an isometric view FIG.

Figure 2A:
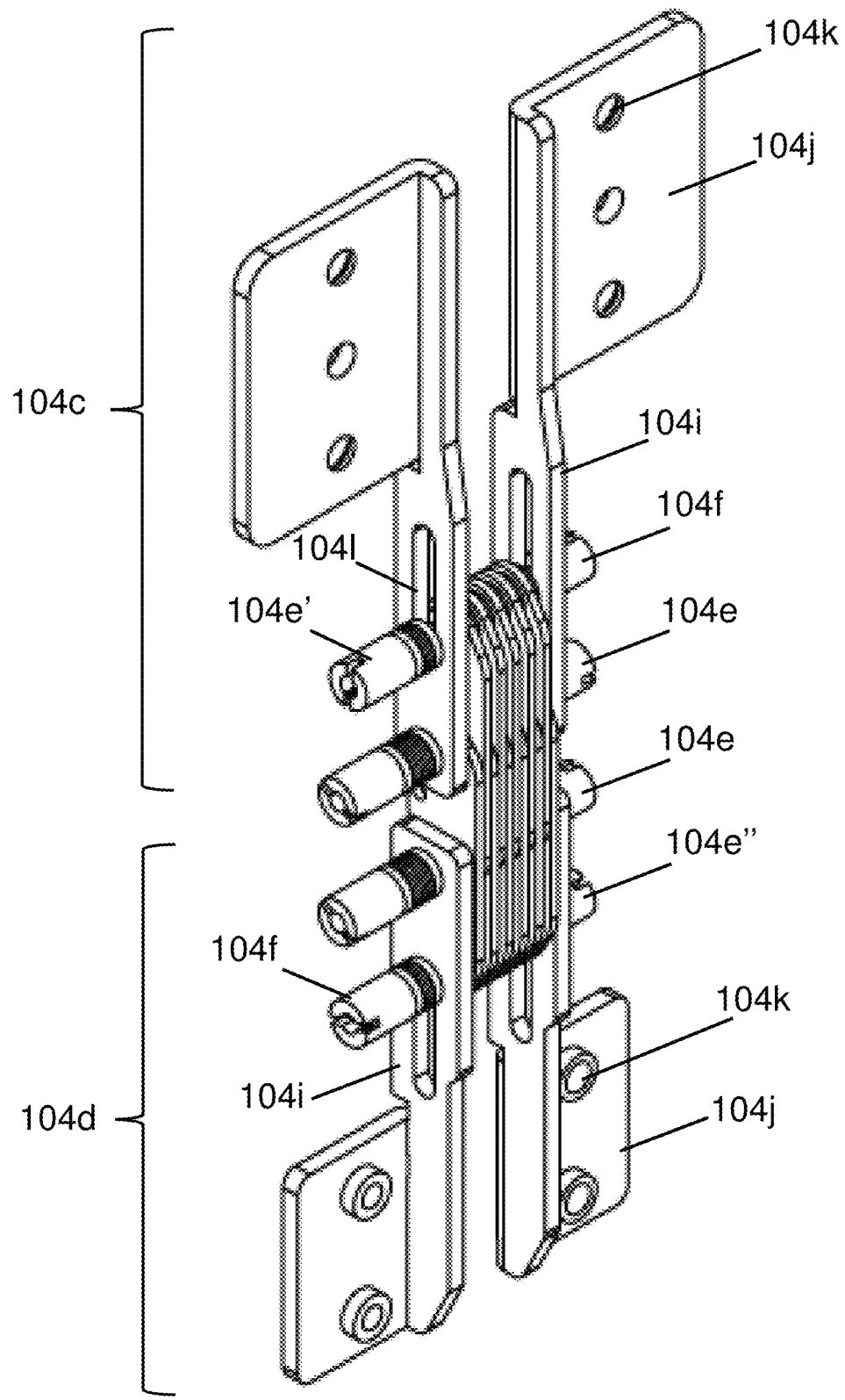
FIG. 2A illustrates an isometric view of a hinge for an auxiliary display system in an open configuration according to an example.
Figure 2B:
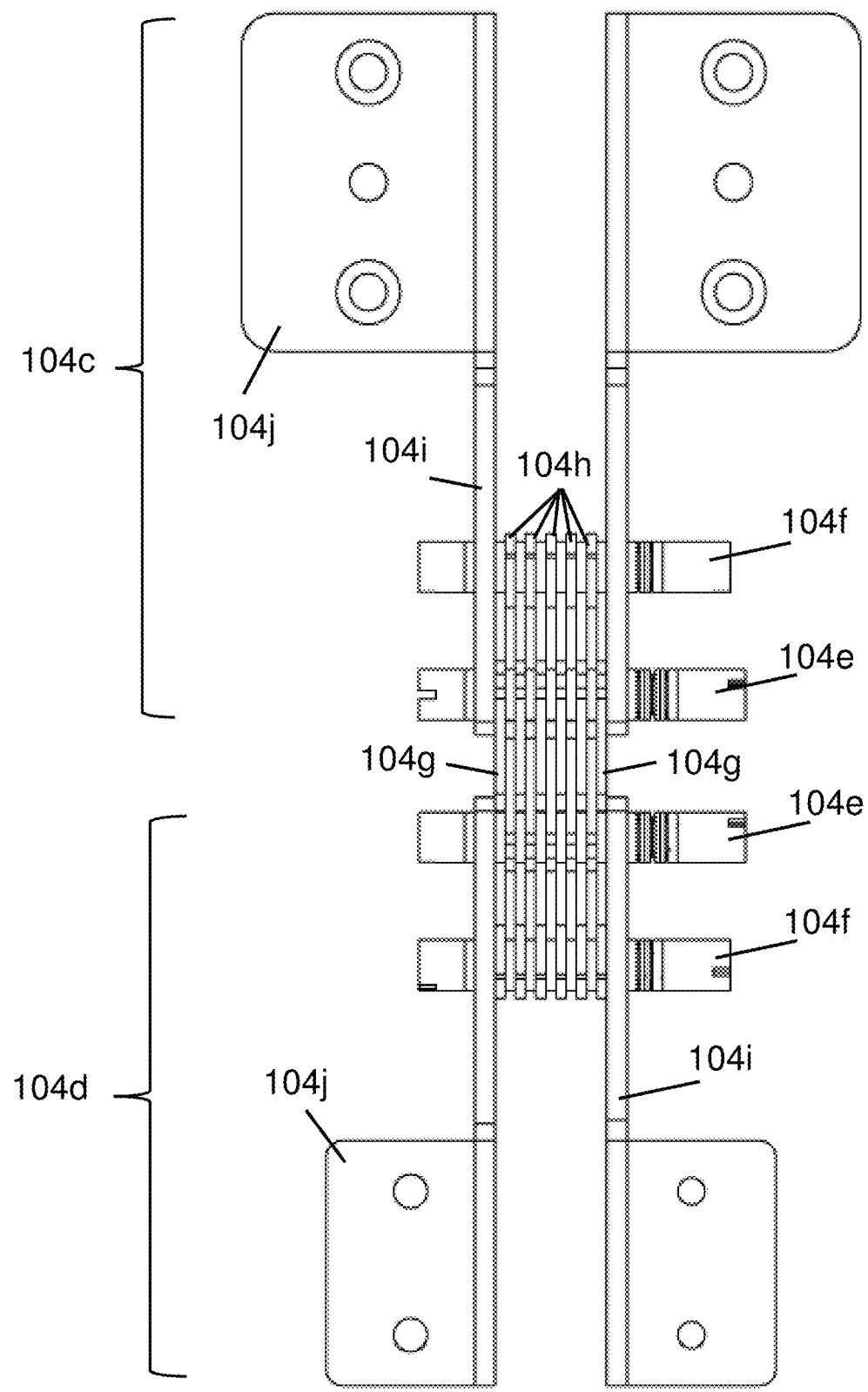
FIG. 2B illustrates a plan view of a hinge for an auxiliary display system in an open configuration according to an example.
Figure 2C:
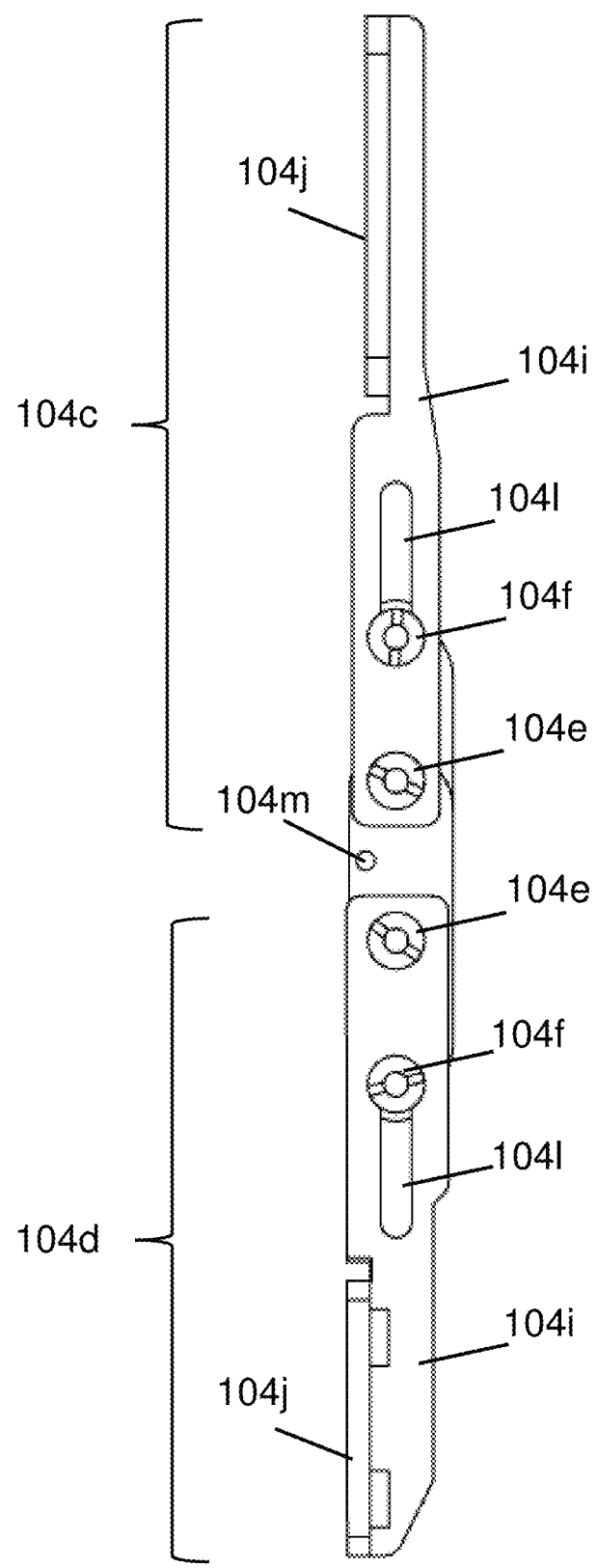
FIG. 2C illustrates an elevational view from the side of a hinge for an auxiliary display system in an open configuration according to an example.
Figure 2D:
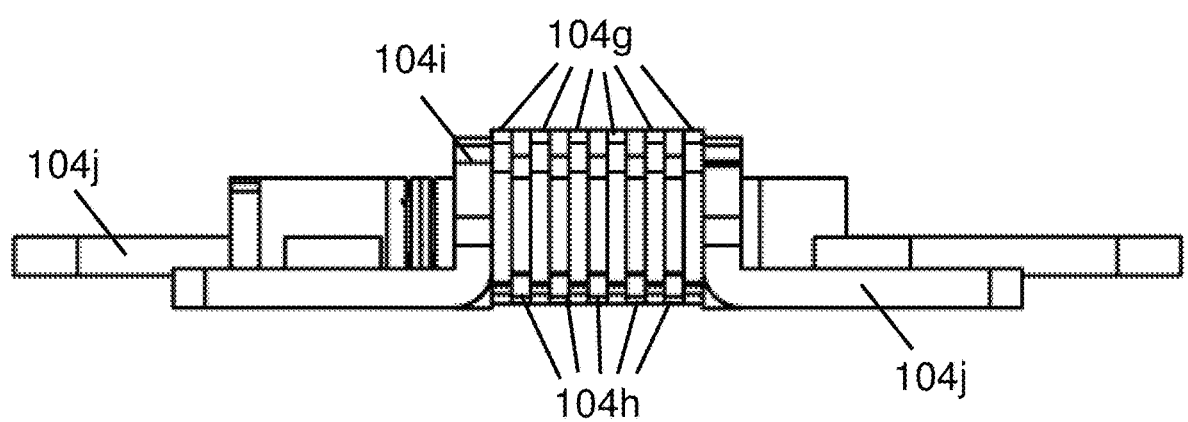
FIG. 2D illustrates an elevational view from an end of a hinge for an auxiliary display system in an open configuration according to an example.
Figure 3A:
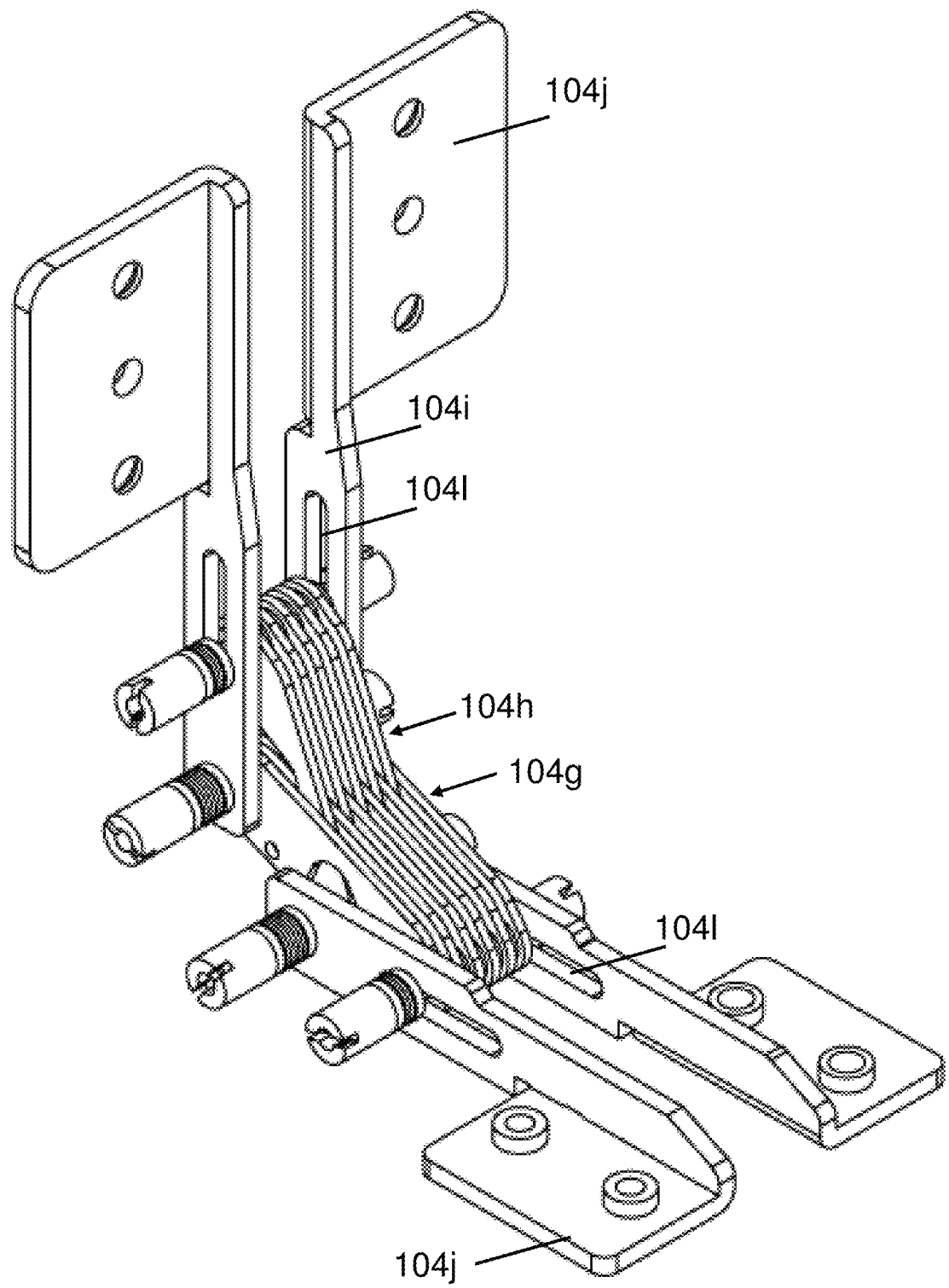
FIG. 3A illustrates an isometric view of a hinge for an auxiliary display system in a partially open configuration according to an example.
Figure 3B:
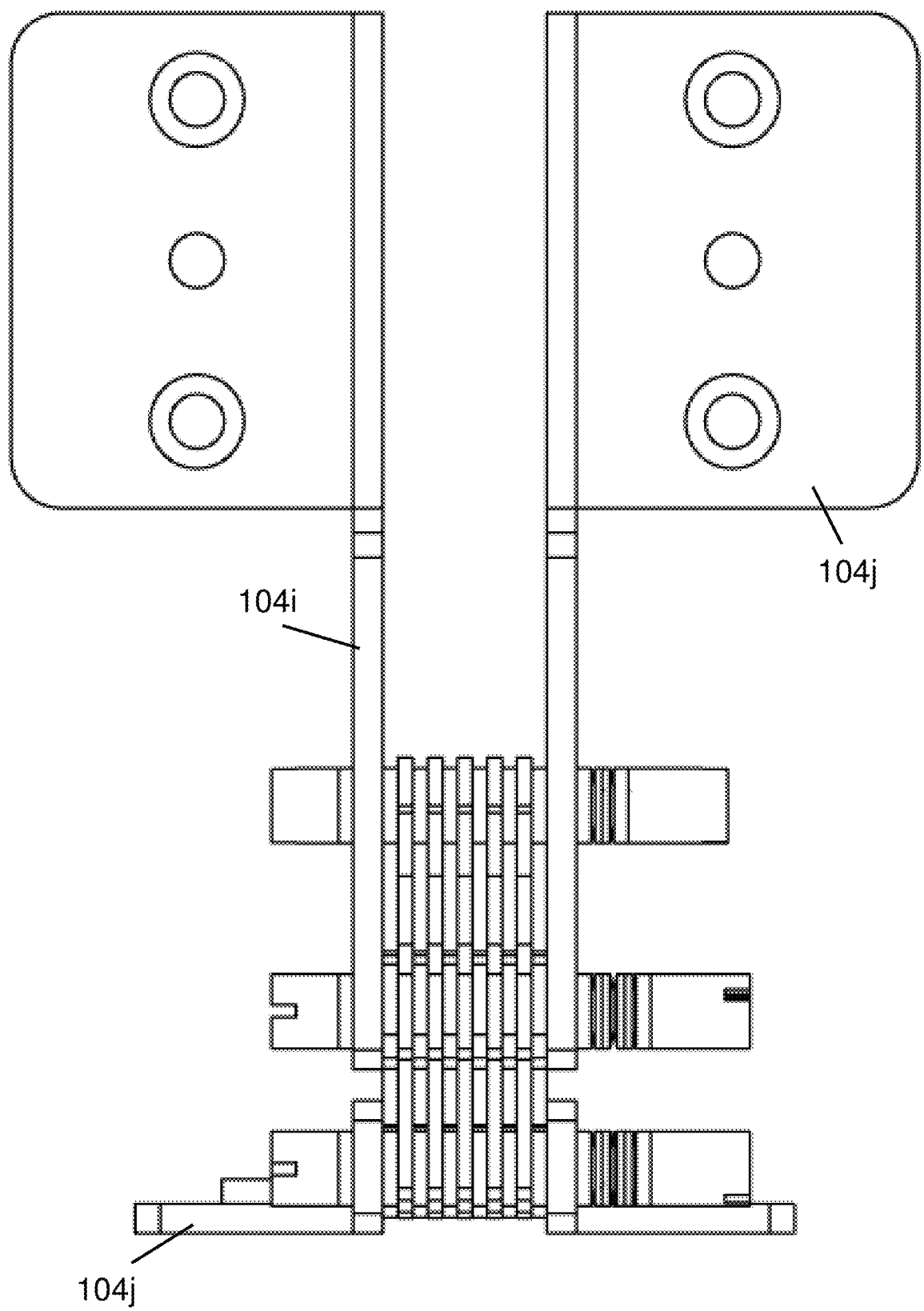
FIG. 3B illustrates a plan view of a hinge for an auxiliary display system in a partially open configuration according to an example.
Figure 3C:
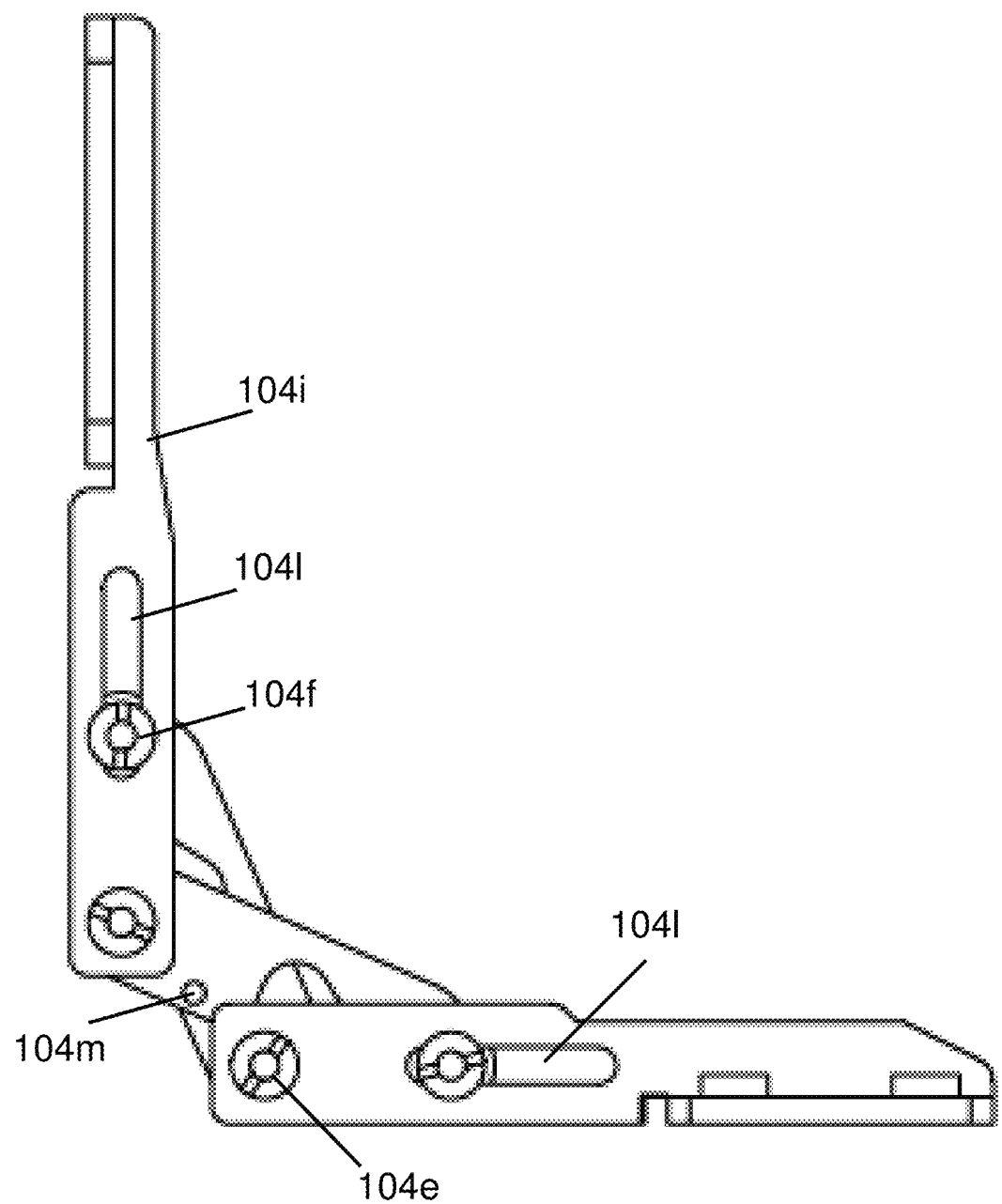
FIG. 3C illustrates an elevational view from the side of a hinge for an auxiliary display system in a partially open configuration according to an example.
Figure 3D:
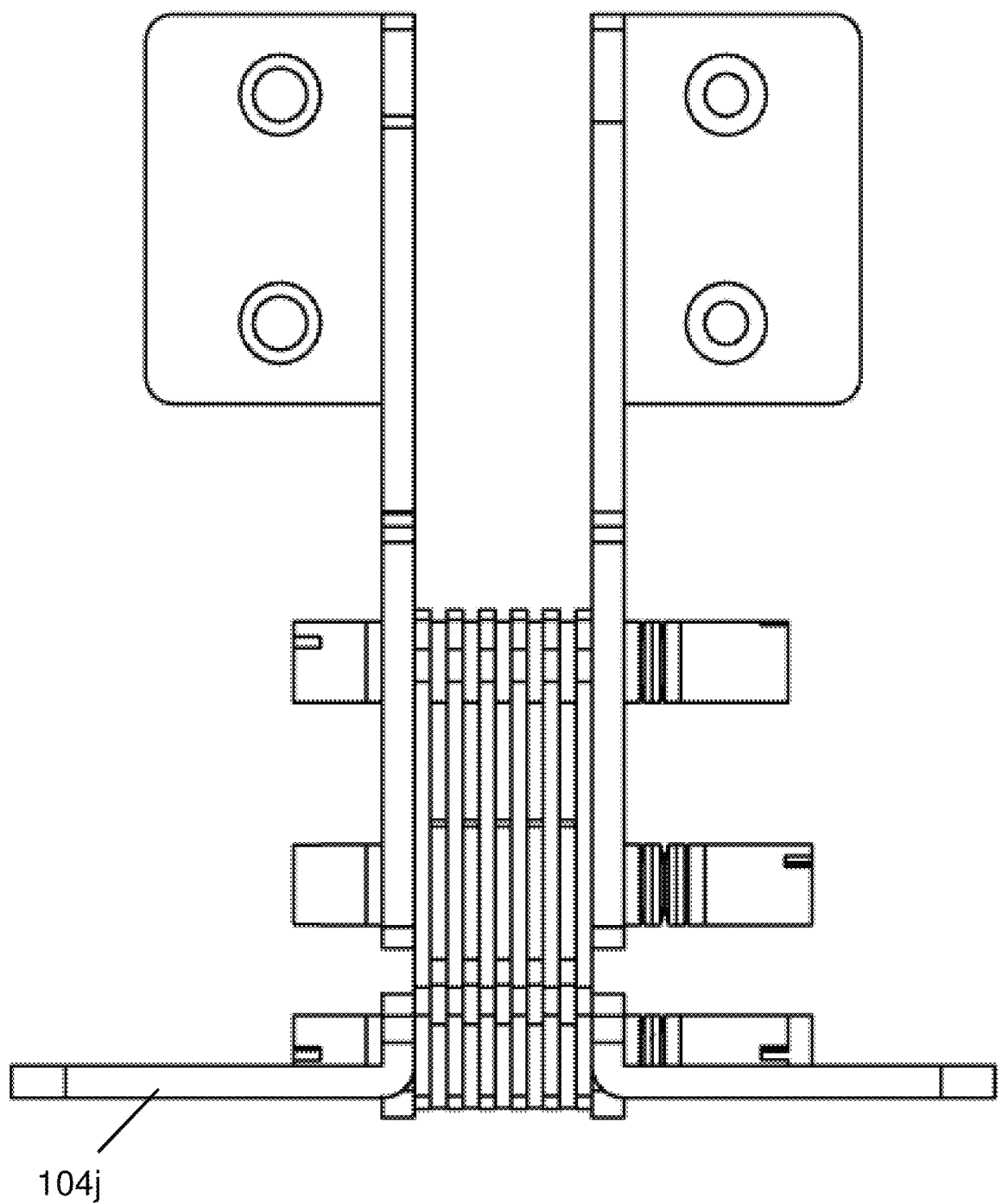
FIG. 3D illustrates an elevational view from an end of a hinge for an auxiliary display system in a partially open configuration according to an example.

2A, in a plan view in FIG. 2B, in an elevational view from the side in FIG. 2C, and in an elevational view from an end in FIG. 2D. The hinge is shown in a configuration in which it is partially closed by 90° in an isometric view FIG. 3A, in a plan view in FIG. 3B, in an elevational view from the side in FIG. 3C, and in an elevational view from an end in FIG. 3D. The hinge is shown in a configuration in which it is fully closed by 180° in an isometric view FIG. 4A, in a plan view in FIG. 4B, in an elevational view from the side in FIG. 4C, and in an elevational view from an end in FIG. 4D.

The hinge 104 includes a first flange portion 104c and a second flange portion 104d. In some embodiments, the first flange portion 104c is configured to be mechanically coupled to the mount 106 of an auxiliary display system as disclosed herein and the second flange portion 104d is configured to be mechanically coupled to a display portion 102 of an auxiliary display system as disclosed herein. In other embodiments the first flange portion 104c is configured to be mechanically coupled to the display portion 102 and the second flange portion 104d is configured to be mechanically coupled to the mount 106. Each of the first flange portion 104c and the second flange portion 104d includes inner pivot pins 104e coupled to the respective first and second flange portions 104c, 104d at positions proximate the other of the respective first and second flange portions 104d, 104c. Each of the first flange portion 104c and the second flange portion 104d also include outer pivot pins 104f coupled to the respective first and second flange portions 104c, 104d at positions distal from the other of the respective first and second flange portions 104d, 104c. The inner and outer pivot pins 104e, 104f may each include a screw nut and washer 104e' and shoulder screw 104e", but in other embodiments may include a nut and bolt, a cotter pin, a clip, or any other form of pin or fastener known in the art that may secure the portions of the hinge 104 together in similar manner as the screw nut and washer 104e' and shoulder screw 104e". Each of the inner pivot pins 104e and the outer pivot pins 104f may lie in a common plane including the axis of rotation when the hinge 104 is in a fully extended configuration.

The first flange portion 104c and the second flange portion 104d are coupled together by a first connector 104g having a first end rotatably coupled about the inner pivot pin 104e of the first flange portion 104c and a second end rotatably coupled about the outer pivot pin 104f of the second flange portion 104d and by a second connector 104h having a first end rotatably coupled about the inner pivot pin 104e of the second flange portion 104d and a second end rotatably coupled about the outer pivot pin 104f of the first flange portion 104c. See FIG. 2B. As further illustrated in FIGS. 2B, 2D and 3A each of the first and second connectors 104g, 104h are formed from a plurality of elongated plates arranged in parallel where the plurality of plates of the first connector 104g are interdigitated or interleaved with the plurality of plates of the second connector 104h. The plates may be formed of a metal, for example, spring steel but embodiments disclosed herein are not limited to any particular materials of construction. In the embodiments shown in FIGS. 2B, 2D and 3A plates of the first connector 104g are on the outside of the interleaved first and second connectors 104g, 104h, but in other embodiments, plates of the second connector 104h may be the outermost plates, or a plate of the first connector 104g may be the outermost plate on one side of the interleaved first and second connectors 104g, 104h and a plate of the second connector 104h may be the outermost plate on the other side of the interleaved first and second connectors 104g, 104h. It should be appreciated that the number of plates of the first and second connectors 104g, 104h are not limited to the numbers illustrated but the first and second connectors 104g, 104h may include a fewer or greater number of plates than illustrated. A greater number of plates may increase the stiffness of the hinge while a lesser number of plates may decrease the stiffness of the hinge due to the friction between the plates of the first and second connectors 104g, 104h. The number of plates of the first and second connectors 104g, 104h may be the same or different and may be an odd or an even number of plates. In some embodiments each of the plurality of plates of the first connector 104g and the plurality of plates of the second connector 104h have same shapes and dimensions. In some embodiments, a central pin 104m (see FIG. 2C) passes through each of the of the plurality of plates of the first connector 104g and the plurality of plates of the second connector 104h. The central pin 104m may pass through each of the of the plurality of plates of the first connector 104g and the plurality of plates of the second connector 104h in a direction parallel to or co-linear with the axis of rotation of the hinge 104. The central pin 104m may define the axis of rotation of the hinge 104.

Each of the first flange portion 104c and the second flange portion 104d include pairs of side members 104i through which the respective inner pivot pins 104e and the respective outer pivot pins 104f pass. The hinge 104 is configured to rotate between a fully open position in which the pair of side members 104i of the first flange 104c portion are colinear with the pair of side members 104i of the second flange portion 104d (see FIG. 2C) to a fully folded configuration in which the pair of side members 104i of the first flange portion 104c are parallel to but not colinear with the pair of side members 104i of the second flange portion 104d (see FIG. 4C). The pairs of side members 104i of each of the respective first flange portion 104c and the second flange portion 104d are arranged in parallel and define spaces therebetween in which at least portions of each of the first connector 104g and second connector 104h are disposed.

The inner pivot pins 104e and outer pivot pins 104f of both of the first flange portion 104c and the second flange portion 104d pass through the pairs of side members 104i of the respective first flange portion 104c and second flange portion 104d in directions parallel to the axis of rotation. The inner pivot pins 104e of both of the first flange portion 104c and the second flange portion 104d are fixedly coupled to the respective pairs of side members 104i of the respective first flange portion 104c and second flange portion 104d.

Figure 4A:
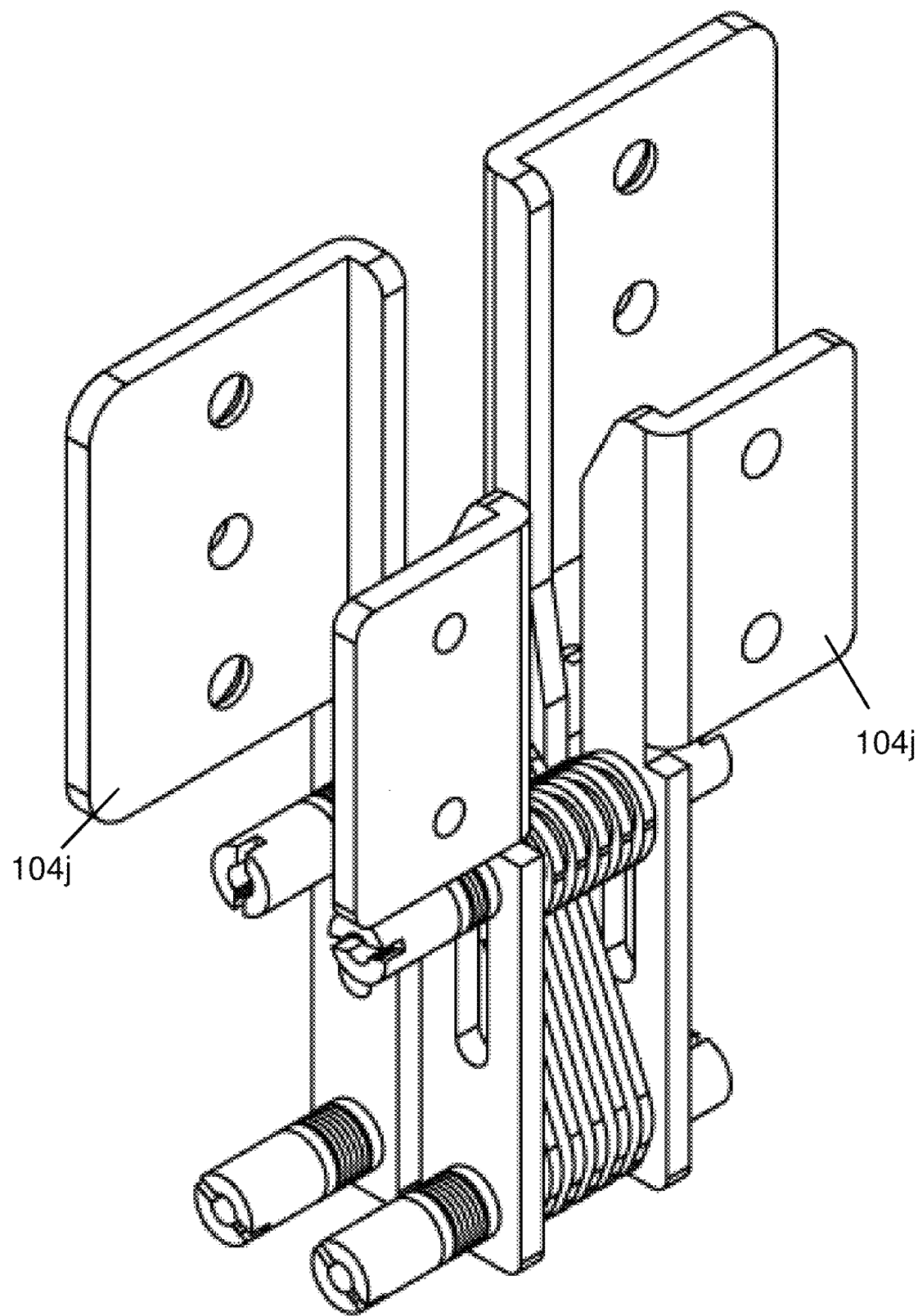
FIG. 4A illustrates an isometric view of a hinge for an auxiliary display system in a closed configuration according to an example.
Figure 4B:
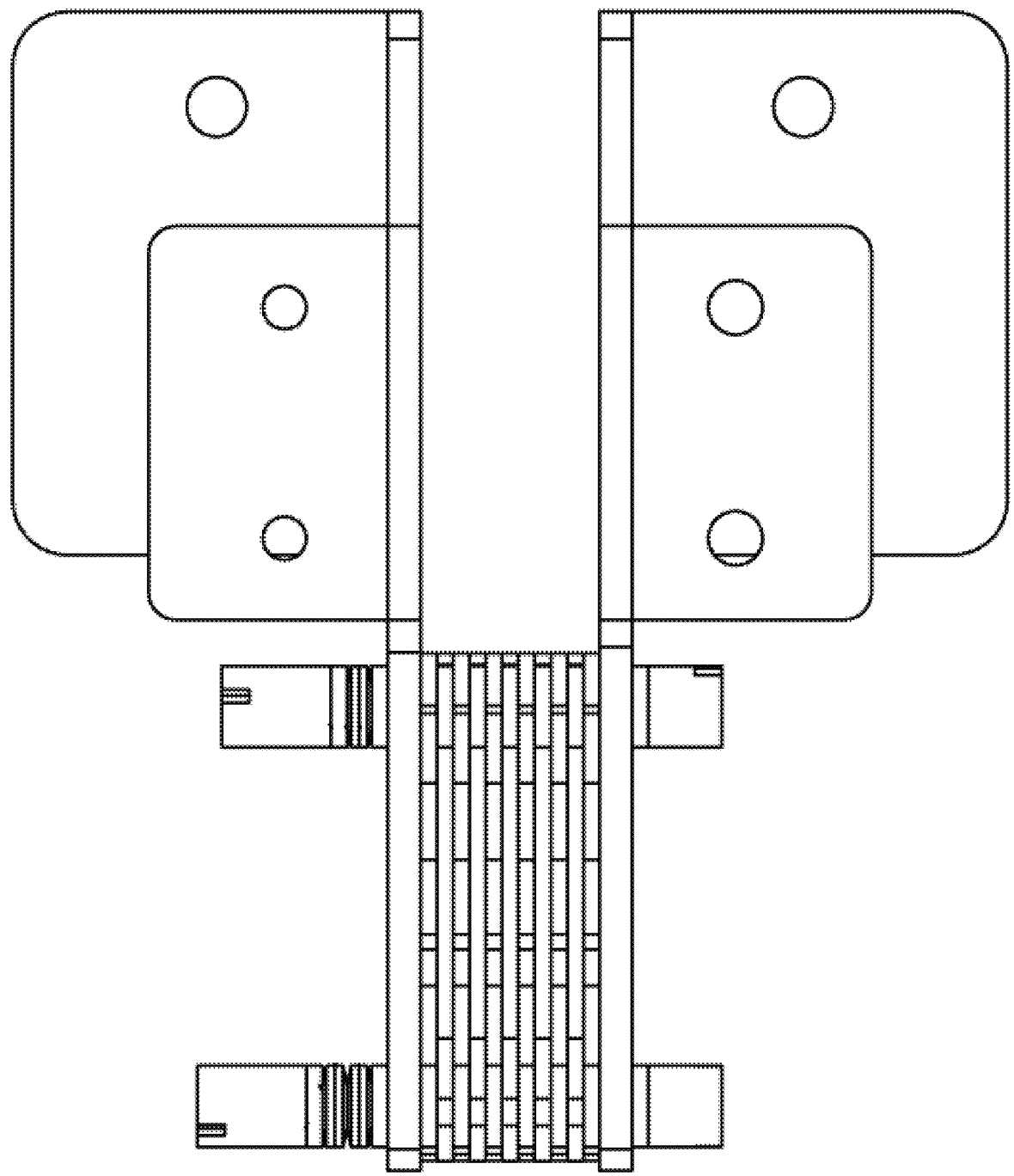
FIG. 4B illustrates a plan view of a hinge for an auxiliary display system in a closed configuration according to an example.
Figure 4C:
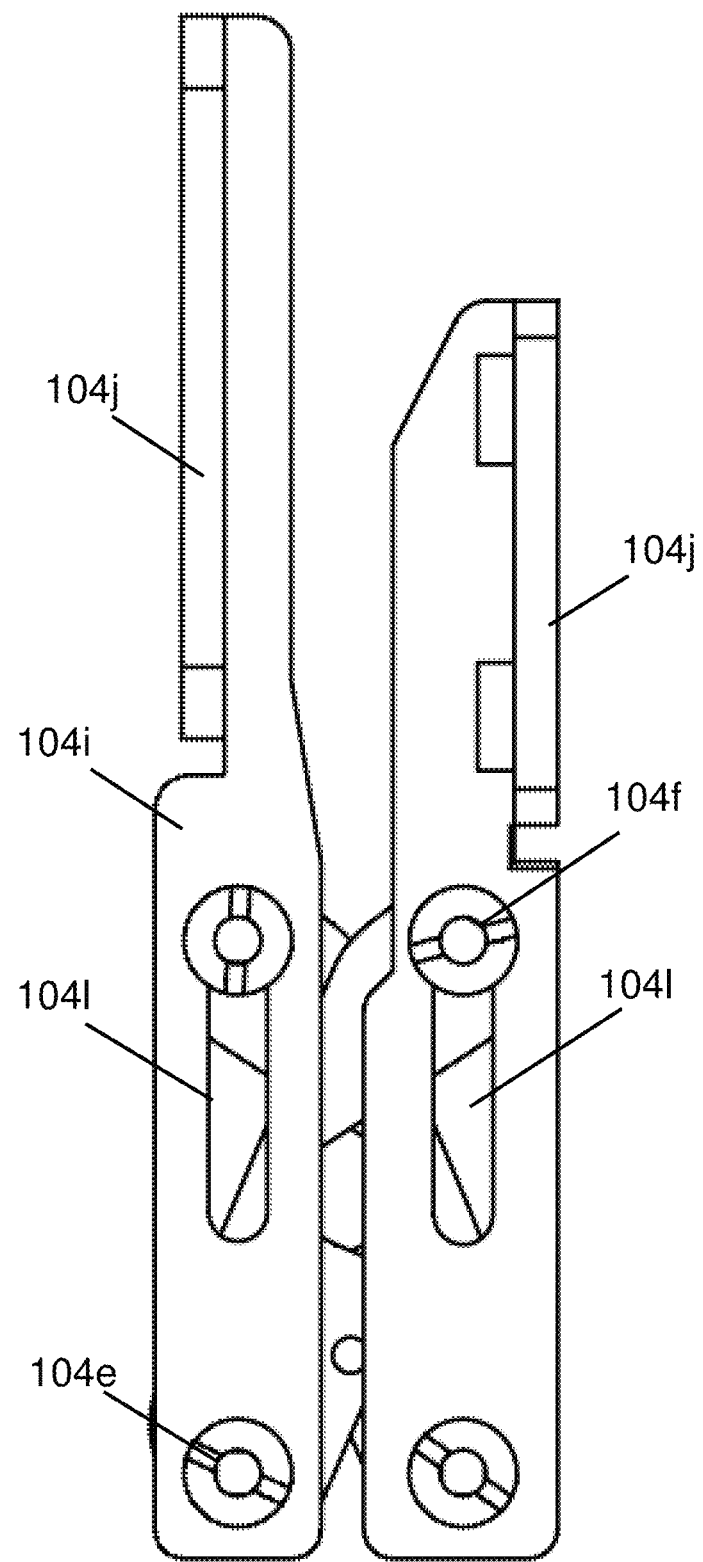
FIG. 4C illustrates an elevational view from the side of a hinge for an auxiliary display system in a closed configuration according to an example.
Figure 4D:
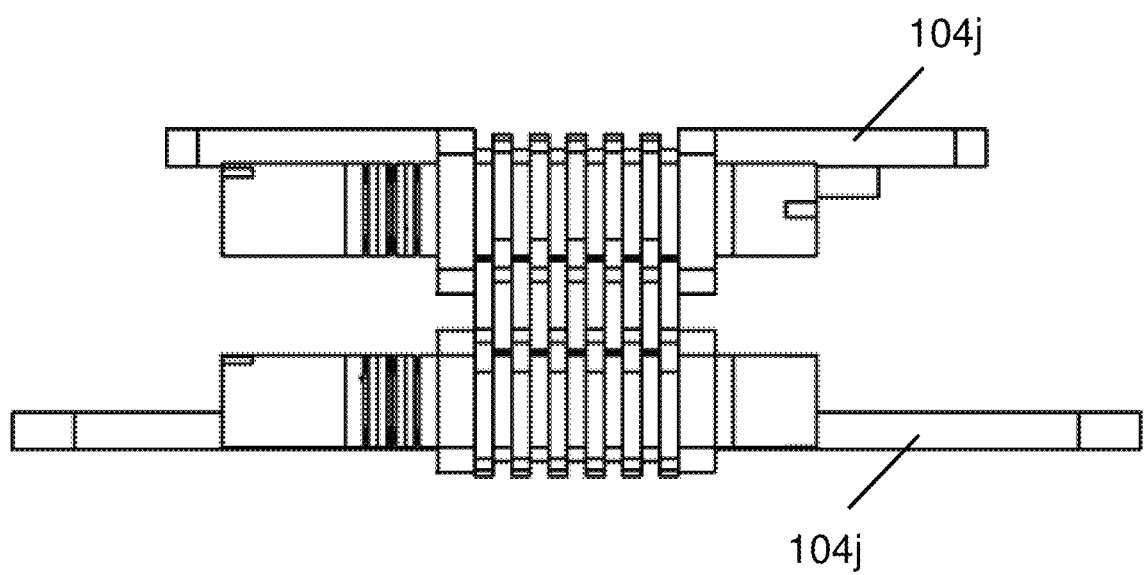
FIG. 4D illustrates an elevational view from an end of a hinge for an auxiliary display system in a closed configuration according to an example.

Each of the side members 104i of the first flange portion and the second flange portion include slots 104l defined therein through which the outer pivot pins 104f pass. The slots 104l may be linear and may be arranged along an extension direction of the side members 104i in a direction normal to the axis of rotation. The outer pivot pins 104f are free to move through the slots 104l as the hinge 104 is opened and closed. The outer pivot pins 104f of both of the first flange portion 104c and the second flange portion 104d reciprocate through the slots 104l defined in the respective pairs of side members 104i of the respective first flange portion 104c and second flange portion 104d upon rotation of the first flange portion 104c relative to the second flange portion 104d. The slots 104l have lengths providing the outer pivot pins 104f with a range of motion sufficient for the first flange portion 104c of the hinge 104 to rotate from zero to 180° relative to the second flange portion 104d of the hinge. As illustrated in FIGS. 2A and 2C the outer pivot pins 104f of both of the first flange portion 104c and the second flange portion 104d are disposed at inner ends of the slots 104*l* defined in the respective pairs of the side members 104*i* of the respective first flange portion 104*c* and second flange portion 104*d* when the hinge 104 is in a fully extended configuration. As illustrated in FIGS. 4A and 4C the outer pivot pins 104*f* of both of the first flange portion 104*c* and the second flange portion 104*d* are disposed at outer ends of the slots 104*l* defined in the respective pairs of the side members 104*i* of the respective first flange portion 104*c* and second flange portion 104*d* when the hinge 104 is in a fully folded configuration.

In some embodiments the two sides (side members 104*i* and flanges discussed below) of each of the first flange portion 104*c* and the second flange portion 104*d* are held together solely by the inner and outer pivot pins 104*e*, 104*f*.

The first flange portion 104*c* further includes at least one flange 104*j* extending from a side of one of the side members 104*i* of the first flange portion 104*c* in a direction parallel to the axis of rotation. The at least one flange 104*j* of the first flange portion 104*c* extends from the side of the one of the side members 104*i* of the first flange portion 104*c* at a location proximate an end of the first flange portion 104*c* distal from the second flange portion 104*d*. The second flange portion 104*d* also further includes at least one flange 104*j* extending from a side of one of the side members 104*i* of the second flange portion 104*d* in a direction parallel to the axis of rotation. The at least one flange 104*j* of the second flange portion 104*d* extends from the side of the one of the side members 104*i* of the second flange portion 104*d* at a location proximate an end of the second flange portion 104*d* distal from the first flange portion 104*c*. In the embodiment illustrated in FIGS. 2A-4D each of the first flange portion 104*c* and the second flange portion 104*d* include two flanges 104*j*, one extending outward from each of the side members 104*i* of the first and second flange portions 104*c*, 104*d*. The flanges 104*j* extend partially along the side members 104*i* and to the ends of the side members 104*i* of each of the first and second flange portions 104*c*, 104*d* that are furthest from the other of the first and second flange portions 104*c*, 104*d*. Each of the flanges 104*j* may include one or more apertures 104*k* to provide for passage of a fastener such as a screw, bolt, pin, clip, or other fastener known in the art so that the flanges 104*j*, and the hinge 104 as a whole, may be fastened to the mount 106 and to the display portion 102 of an auxiliary display system 100.

Figure 5A:
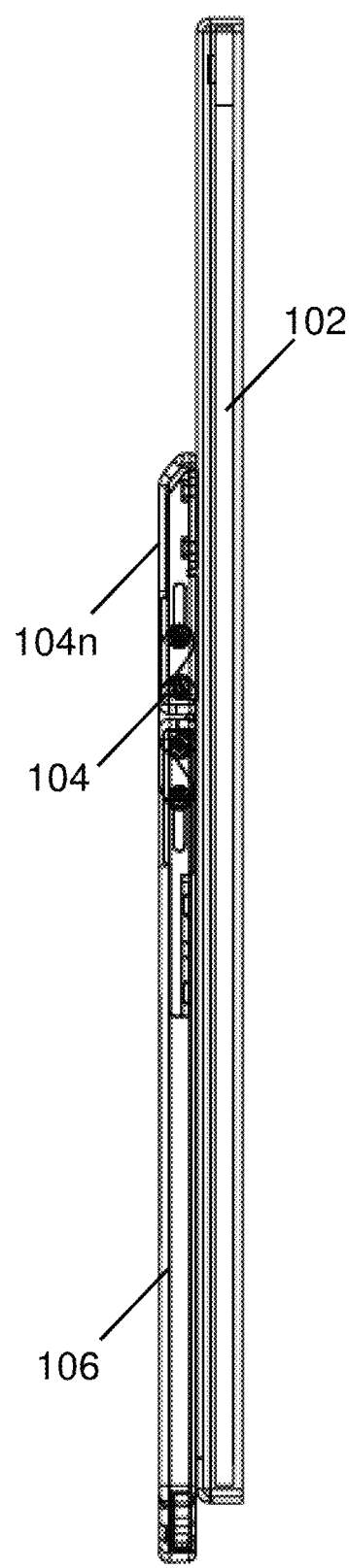
FIG. 5A illustrates a cross-sectional view of the auxiliary display system in a closed configuration according to one example.
Figure 5B:
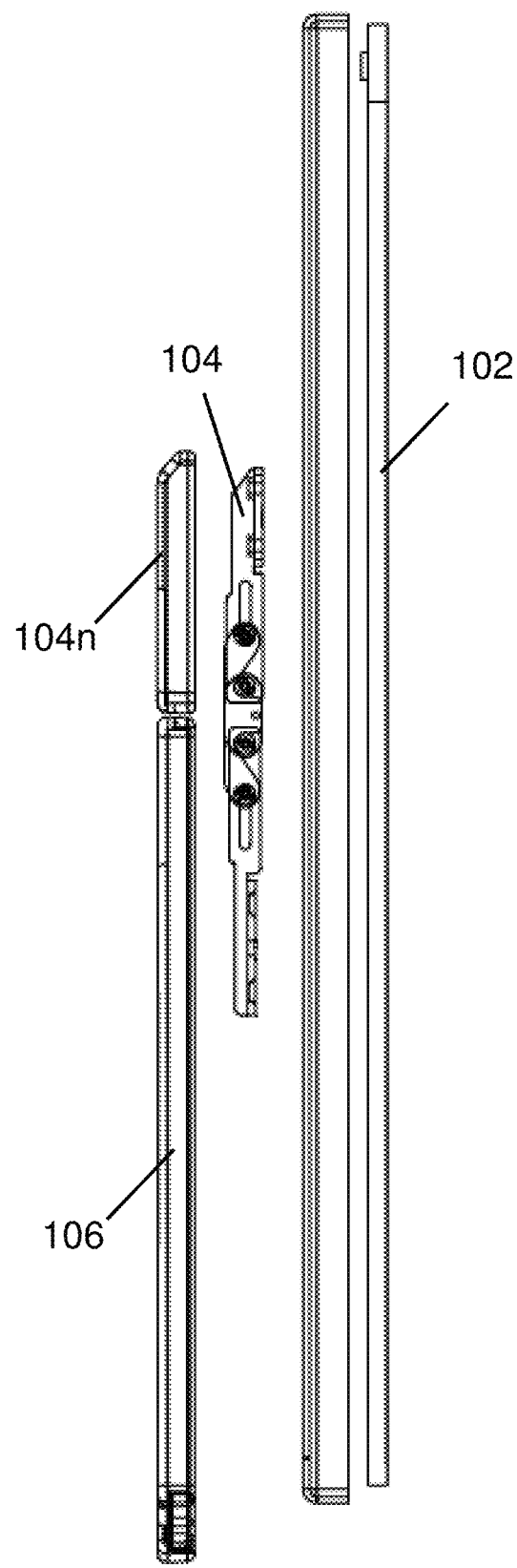
FIG. 5B illustrates an exploded view of the auxiliary display system in a closed configuration according to one example.
Figure 5C:
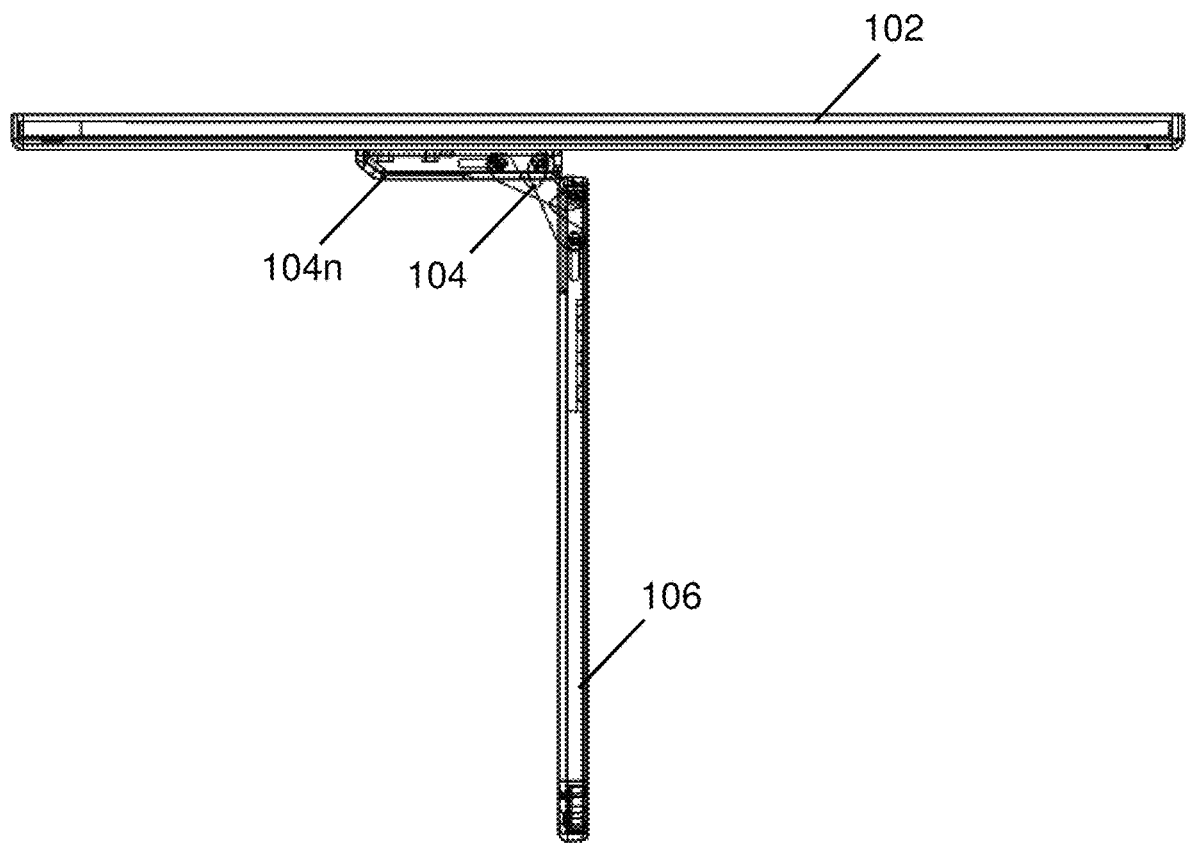
FIG. 5C illustrates a cross-sectional view of the auxiliary display system in a partially open configuration according to one example.
Figure 5D:
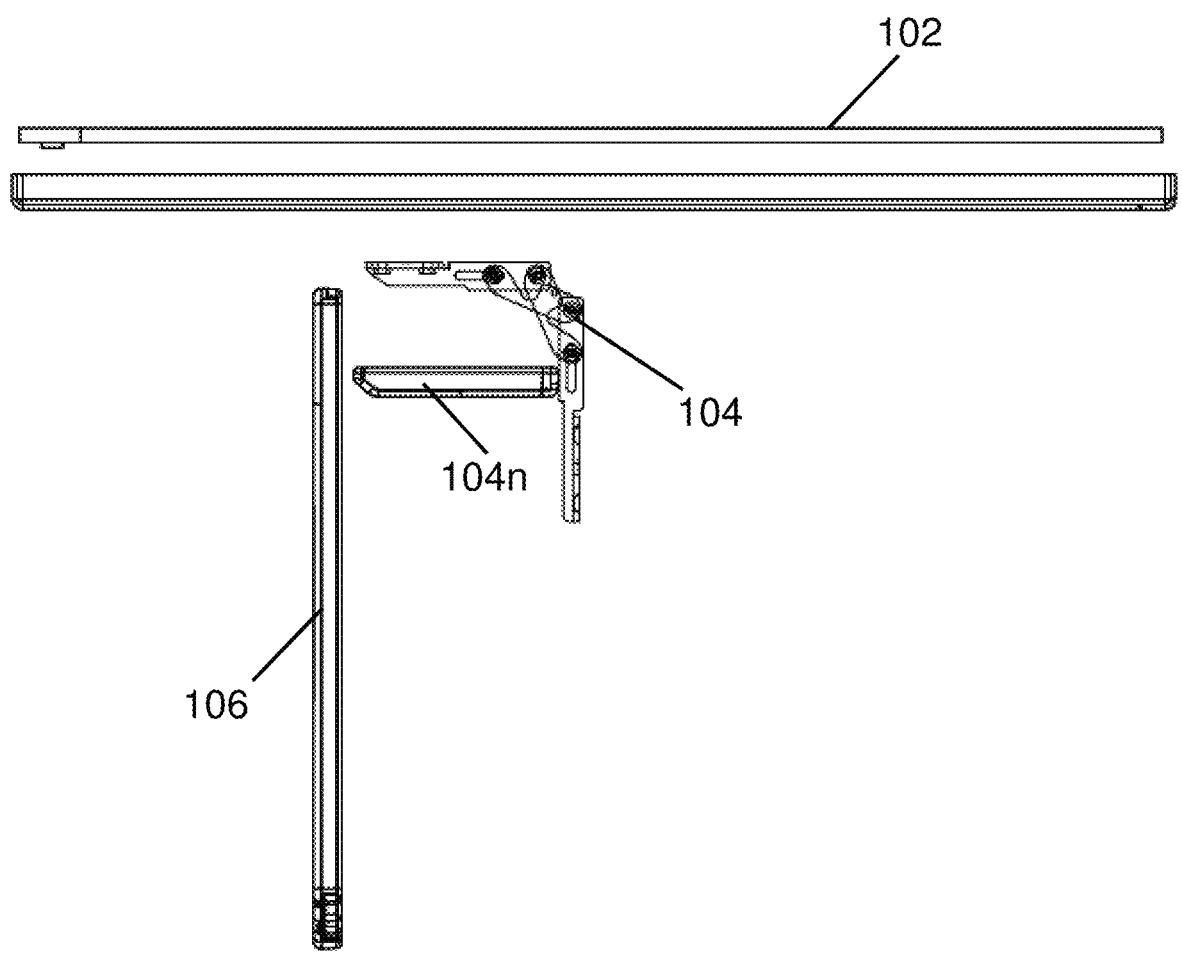
FIG. 5D illustrates an exploded view of the auxiliary display system in a partially open configuration according to one example.
Figure 5E:
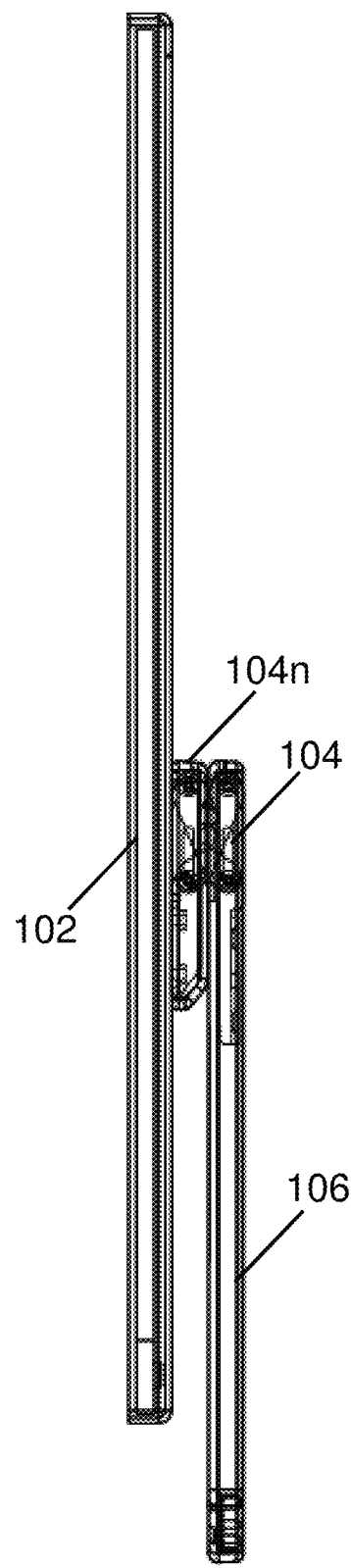
FIG. 5E illustrates a cross-sectional view of the auxiliary display system in a fully open configuration according to one example.
Figure 5F:
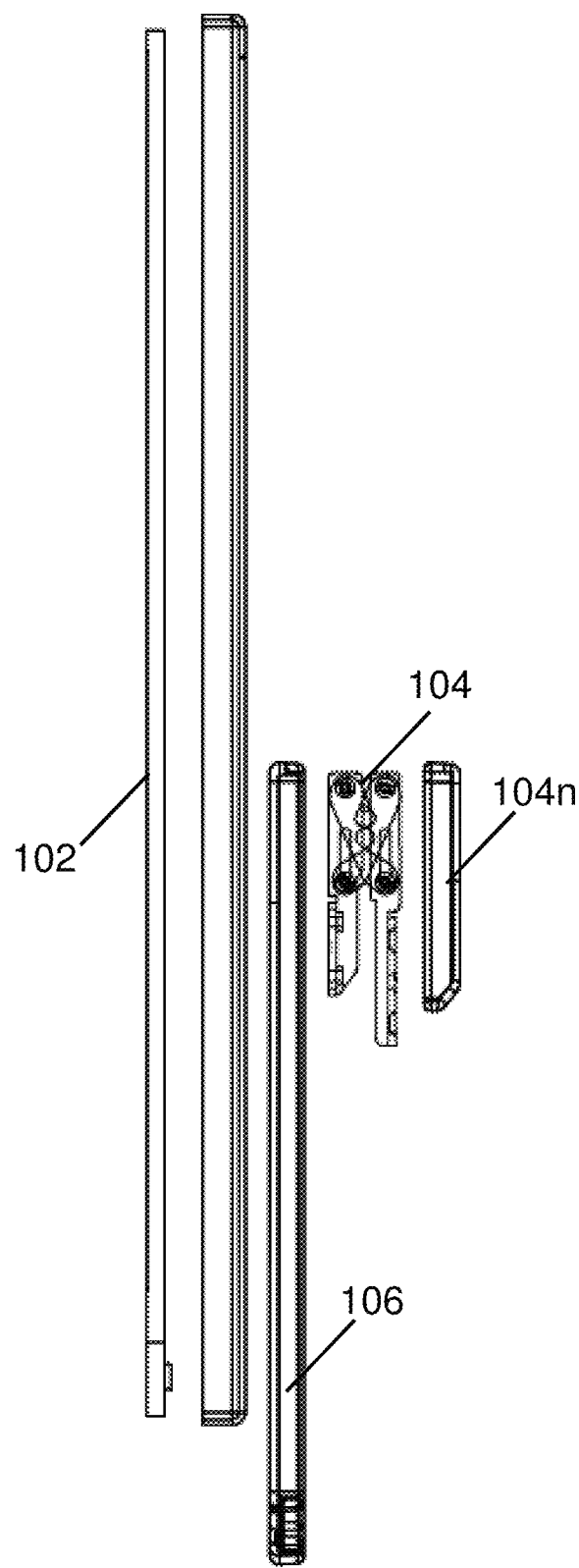
FIG. 5F illustrates an exploded view of the auxiliary display system in a fully open configuration according to one example.

As noted above, when an auxiliary display system 100 in accordance with the present disclosure is assembled, the flanges 104*j* of one of the first and second flange portions 104*c*, 104*d* are attached to the mount 106 and the flanges 104*j* of the other of the first and second flange portions 104*c*, 104*d* are attached to the display portion 102 of an auxiliary display system 100 to couple the mount 106 to the display portion 102 while allowing rotation of the mount 106 and display portion 102 relative to each other. The range of rotation may be up to 180°. The flanges 104*j* may be mechanically secured to the mount 106 and display portion 102 within casings of the mount 106 and/or display portion 102 or to outer surfaces of the casings of the mount 106 and/or display portion 102, for example, within recesses defined in the casings of the mount 106 and/or display portion 102 so that the surfaces of the flanges 104*j* are in the same or substantially same plane as the surrounding portions of the casings. FIGS. 5A and 5B illustrate a mount 106 and display portion 102 of an auxiliary display system 100 connected by hinges 104 as disclosed herein in a fully closed configuration in a cross-sectional view (FIG. 5A) and in an exploded view (FIG. 5B). FIGS. 5C and 5D illustrate a mount 106 and display portion 102 of an auxiliary display system 100 connected by hinges 104 as disclosed herein in a configuration with the mount 106 and display portion 102 arranged at 90° to one another in a cross-sectional view (FIG. 5C) and in an exploded view (FIG. 5D). FIGS. 5E and 5F illustrate a mount 106 and display portion 102 of an auxiliary display system 100 connected by hinges 104 as disclosed herein in a fully open configuration in a cross-sectional view (FIG. 5E) and in an exploded view (FIG. 5F). As illustrated in FIGS. 5A-5E the hinges 104 may be provided with a cover 104*n*.

At least one auxiliary display system has been disclosed. The auxiliary display system is capable of receiving input information from a user and providing output information to a user. The auxiliary display system increases the physical footprint of an associated device, such as a laptop computer, by a marginal amount, while providing significant benefits in the amount of information that can be exchanged between the user and the combination of the associated device and the auxiliary display system. The auxiliary display system also expands the functionality of the associated device, such as by allowing the auxiliary display system to be used in a similar manner as a tablet computer, laptop computer, and so forth.

No limitation of the auxiliary display system is meant to be implied by the word "auxiliary." The auxiliary display system may be used even when an associated device is in an idle or sleep mode such that the auxiliary display system is the only active device. For example, where the associate device is a laptop computer, the laptop computer may be closed and in a sleep mode while the user continues to use the auxiliary display system. Furthermore, no limitation is meant to be implied by the word "display." Although some examples of the auxiliary display system are capable of displaying output information, some examples of the auxiliary display system are also capable of receiving input information from a user, such as via touch inputs. In alternate examples, the auxiliary display system is only capable of displaying information to a user, and receiving information via the associated device, but incapable of receiving touch inputs from a user.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An auxiliary display system comprising:
   a mount configured to be coupled to a computing device;
   a display portion including a display screen; and
   at least one hinge coupling the mount to the display portion and enabling rotation of the display portion relative to the mount about an axis of rotation, the at least one hinge including:
      a first flange portion configured to be mechanically coupled to the mount;
      a second flange portion configured to be mechanically coupled to the display portion;
      inner pivot pins coupled to each of the respective first and second flange portions at positions proximate the other of the respective first and second flange portions;

outer pivot pins coupled to each of the respective first and second flange portions at positions distal from the other of the respective first and second flange portions;

a first connector having a first end rotatably coupled about the inner pivot pin of the first flange portion and a second end rotatably coupled about the outer pivot pin of the second flange portion; and a second connector having a first end rotatably coupled about the inner pivot pin of the second flange portion and a second end rotatably coupled about the outer pivot pin of the first flange portion.

2. The system of claim 1, wherein each of the first flange portion and the second flange portion include pairs of side members through which the respective inner pivot pins and the respective outer pivot pins pass.

3. The system of claim 2, wherein:

the first flange portion includes at least one flange extending from a side of one of the side members of the first flange portion in a direction parallel to the axis of rotation; and the second flange portion includes at least one flange extending from a side of one of the side members of the second flange portion in a direction parallel to the axis of rotation.

4. The system of claim 3, wherein:

the at least one flange of the first flange portion extends from the side of the one of the side members of the first flange portion at a location proximate an end of the first flange portion distal from the second flange portion; and the at least one flange of the second flange portion extends from the side of the one of the side members of the second flange portion at a location proximate an end of the second flange portion distal from the first flange portion.

5. The system of claim 2, wherein the inner pivot pins and outer pivot pins of both of the first flange portion and the second flange portion pass through the pairs of side members of the respective first flange portion and second flange portion in directions parallel to the axis of rotation.

6. The system of claim 5, wherein the inner pivot pins of both of the first flange portion and the second flange portion are fixedly coupled to the respective pairs of side members of the respective first flange portion and second flange portion.

7. The system of claim 5, wherein the outer pivot pins of both of the first flange portion and the second flange portion pass through slots defined in the respective pairs of side members of the respective first flange portion and second flange portion.

8. The system of claim 7, wherein the outer pivot pins of both of the first flange portion and the second flange portion reciprocate through the slots defined in the respective pairs of side members of the respective first flange portion and second flange portion upon rotation of the first flange portion relative to the second flange portion.

9. The system of claim 8, wherein the slots have lengths providing for the first flange portion of the hinge to rotate from zero to 180° relative to the second flange portion of the hinge.

10. The system of claim 8, wherein the outer pivot pins of both of the first flange portion and the second flange portion are disposed at inner ends of the slots defined in the respective pairs of the side members of the respective first flange portion and second flange portion when the hinge is in a fully extended configuration.

11. The system of claim 8, wherein the outer pivot pins of both of the first flange portion and the second flange portion are disposed at outer ends of the slots defined in the respective pairs of the side members of the respective first flange portion and second flange portion when the hinge is in a fully folded configuration.

12. The system of claim 2, wherein the hinge is configured to rotate between a fully open position in which the pair of side members of the first flange portion are colinear with the pair of side members of the second flange portion to a fully folded configuration in which the pair of side members of the first flange portion are parallel to but not colinear with the pair of side members of the second flange portion.

13. The system of claim 2, wherein the pairs of side members of each of the respective first flange portion and the second flange portion are arranged in parallel and define spaces therebetween in which at least portions of each of the first connector and second connector are disposed.

14. The system of claim 2, wherein each of the side members of the first flange portion is colinear with a respective one of the side members of the second flange portion when the hinge is in a fully extended configuration.

15. The system of claim 1, wherein the first flange portion of the hinge is configured to rotate from zero to 180° relative to the second flange portion of the hinge.

16. The system of claim 1, wherein the first connector and the second connector each include a plurality of elongated plates arranged in parallel.

17. The system of claim 16, wherein the plurality of plates of the first connector are interdigitated with the plurality of plates of the second connector.

18. The system of claim 16, wherein each of the plurality of plates of the first connector and the plurality of plates of the second connector have same shapes and dimensions.

19. The system of claim 16, further comprising a central pin passing through each of the plurality of plates of the first connector and the plurality of plates of the second connector.

20. The system of claim 19, wherein the central pin passes through each of the plurality of plates of the first connector and the plurality of plates of the second connector in a direction parallel to the axis of rotation.

21. The system of claim 19, wherein the central pin passes through each of the plurality of plates of the first connector and the plurality of plates of the second connector in a direction co-linear with the axis of rotation.

22. The system of claim 1, wherein each of the inner pivot pins and the outer pivot pins lie in a common plane including the axis of rotation when the hinge is in a fully extended configuration.

* * * * *